United States Patent [19]

Styron

[11] Patent Number: 5,484,480
[45] Date of Patent: Jan. 16, 1996

[54] USE OF ALUMINA CLAY WITH CEMENT FLY ASH MIXTURES

[75] Inventor: Robert W. Styron, Marietta, Ga.

[73] Assignee: JTM Industries, Inc., Kennesaw, Ga.

[21] Appl. No.: 138,762

[22] Filed: Oct. 19, 1993

[51] Int. Cl.$^6$ .............................. C04B 7/34; C04B 14/02
[52] U.S. Cl. .......................... 106/706; 106/705; 106/692;
106/696; 106/793; 106/792; 106/802; 106/803;
106/805; 106/823; 106/DIG. 1; 264/DIG. 49
[58] Field of Search ..................................... 106/705, 706,
106/802, 805, 819, 823, DIG. 1, 692, 696,
792, 793, 803; 264/DIG. 49; 324/650

[56] References Cited

U.S. PATENT DOCUMENTS

| | | | |
|---|---|---|---|
| 2,527,766 | 10/1950 | Rule | 106/706 |
| 2,815,293 | 12/1957 | Randall et al. | 106/706 |
| 3,528,832 | 9/1970 | Ericsson et al. | 106/805 |
| 3,759,729 | 9/1973 | Fahn | 106/805 |
| 4,121,945 | 10/1978 | Hurst et al. . | |
| 4,210,457 | 7/1980 | Dodson et al. | 106/706 |
| 4,230,502 | 10/1980 | Lustig et al. | 106/805 |
| 4,240,952 | 12/1980 | Hulbert, Jr. et al. | 106/705 |
| 4,366,209 | 12/1982 | Babcock . | |
| 4,374,672 | 2/1983 | Funston et al. | 106/706 |
| 4,488,909 | 12/1984 | Galer et al. . | |
| 4,624,711 | 11/1986 | Styron . | |
| 4,659,385 | 4/1987 | Costopoulos et al. | 106/DIG. 1 |
| 4,683,006 | 7/1987 | Walker . | |
| 4,731,120 | 3/1988 | Tuuttl | 106/706 |
| 4,741,782 | 5/1988 | Styron . | |
| 4,802,922 | 2/1989 | Smart . | |
| 4,842,649 | 6/1989 | Heitzmann et al. | 106/706 |
| 4,875,937 | 10/1989 | Viles . | |
| 4,915,740 | 4/1990 | Sakai et al. . | |

FOREIGN PATENT DOCUMENTS 8140366  8/1983  Japan .

OTHER PUBLICATIONS

"Cement Research Progress 1983:, Chapter 9, Blended and modified portland cements & high alumina cement", P. K. Mehta, 1983 (no month).
"Study of Cast–In–Place High–Strength Concrete Made with Silica Fume, Alumina–Type Mineral, and Fly Ash", Kakizaki et al (Date unknown).

*Primary Examiner*—Mark L. Bell
*Assistant Examiner*—Michael Marcheschi
*Attorney, Agent, or Firm*—Biebel & French

[57] ABSTRACT

A cementitious mixture includes hydraulic cement, fly ash, and an effective amount of unfired nature finely divided material, such as a clay, containing at least about 35% alumina, to accelerate the early strength of a mix. A method of accelerating early strength in a cementitious mix comprises the adding of alumina in the form of an unfired raw material, such as clay, in an effective amount in such mix.

10 Claims, 4 Drawing Sheets

FIG-3
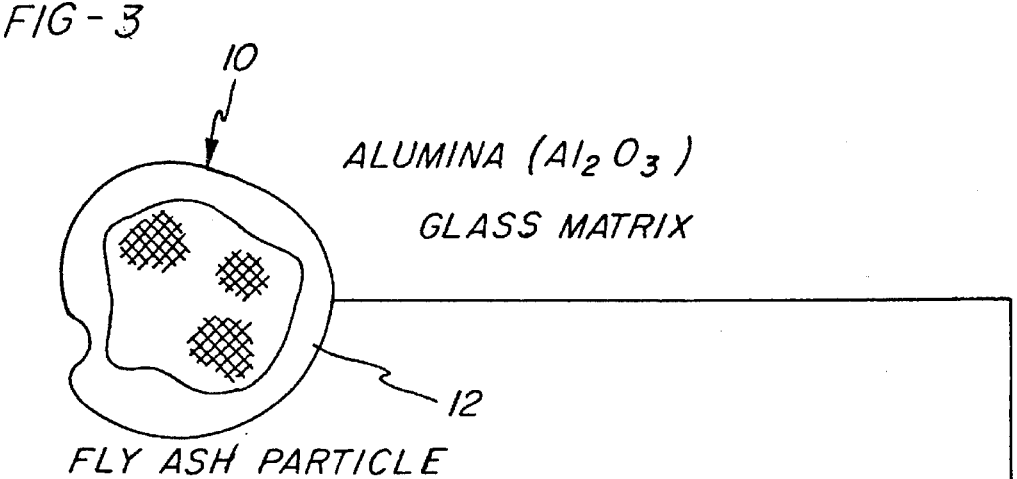
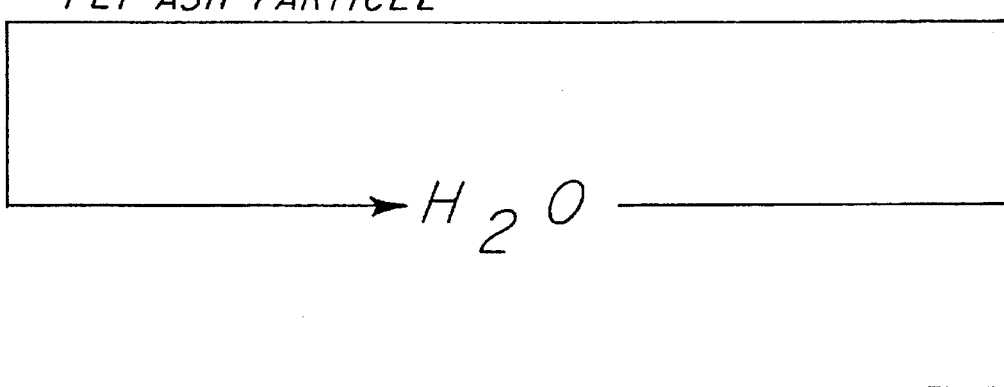
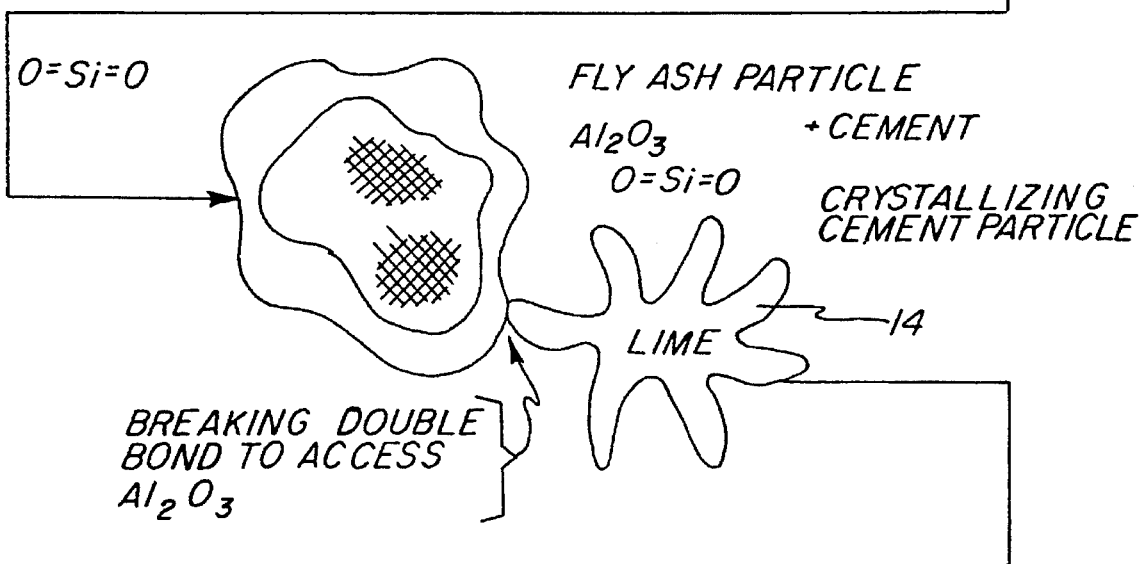
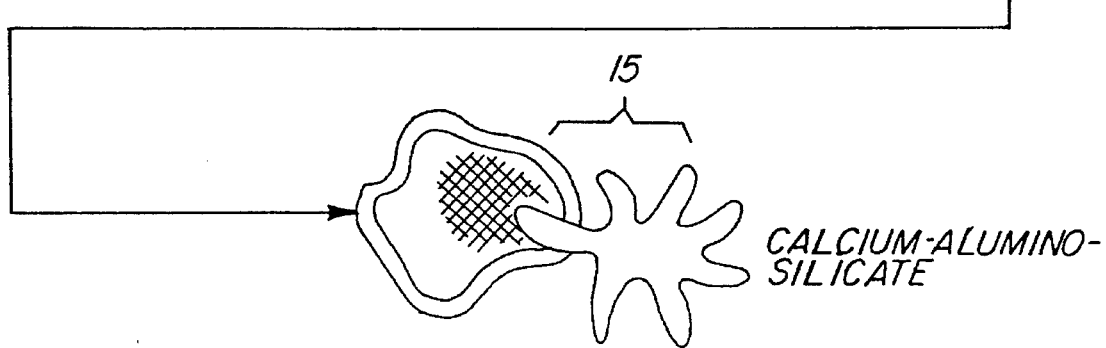

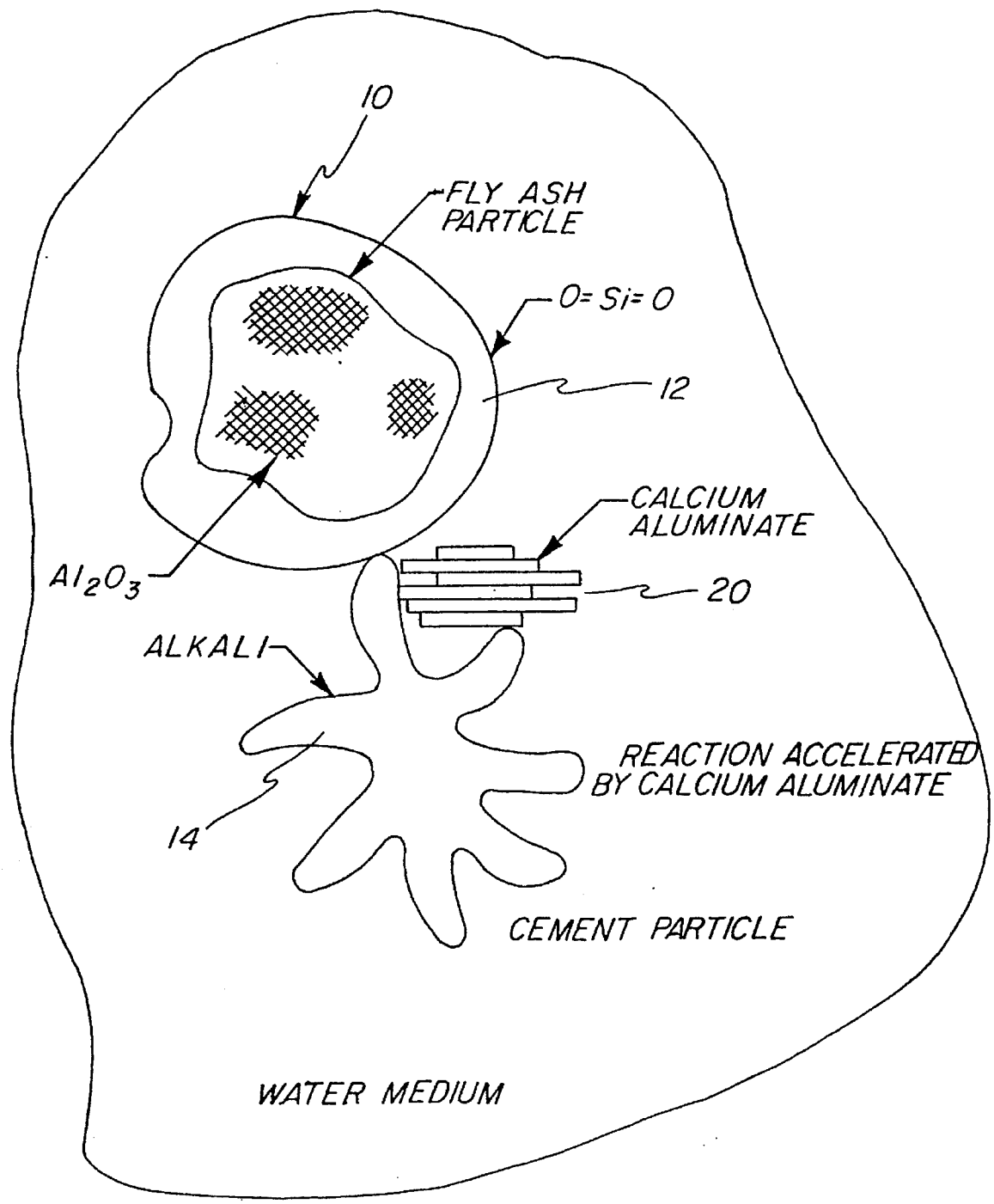

USE OF ALUMINA CLAY WITH CEMENT FLY ASH MIXTURES

BACKGROUND OF THE INVENTION

This invention relates to the use of calcium aluminate and/or alumina bearing clays to enhance and accelerate the reaction rate and to increase early and final strengths in hydraulic-type cements, and also relates to the enhancement and acceleration of the reaction rate in fly ash/cementitious mixtures.

By the term "hydraulic cement", all cementitious water activated cements are intended, including rapid hardening, ordinary, low heat, and sulfate-resistant Portland cements, high alumina cements, conventional hydraulic (i. e., underwater setting) cements, and related products which have been burned or clinkered and then ground to a fine powder.

"Alumina clay" as used herein is intended to encompass any natural or raw finely divided ground clay-like product with maximum particle size not substantially in excess of five microns, and having an alumina component, such as in the form of calcium aluminate or aluminum oxide of at least 35% by weight. As representative, but not intended to be limiting, suitable clays may include kaolin, mullite, crushed bauxite or gibbsite and related unfired bauxitic clays, roller mill clay and similar clay products containing the requisite alumina content, preferably not calcined, and in a finely powdered state.

Calcium aluminate (tricalcium aluminate-$3CaOAl_2O_2$) may be a powder or crystals with a specific gravity (25° C.) of 3.038, decomposing at 1535° C., and soluble in acids. Calcium aluminate is an important ingredient of Portland cement. It has been noted over the years that coal fly ash contained amounts of mullite, which is thought to be the fired form of calcium aluminate. This was especially noted in samples of material collected from dust collectors utilized for fly ash. The samples collected from said dust collectors are very fine and have a distinctive yellow clay color.

Cement is manufactured from a number of ingredients, and .lay be considered as a product obtained by intimately mixing together calcareous and argillaceous, or other silica, alumina, and iron oxide bearing materials, burning them at a clinkering temperature, and grinding the resulting clinker. Portland cement is prepared by igniting a mixture of raw materials, one of which is mainly composed of calcium carbonate and the other of aluminum silicates. The most typical materials answering to this description are limestone and clay, both of which occur in nature in a great number of varieties. Marls composed of a mixture of chalk and clay, and shales; are also common raw materials.

Early civilizations utilized lime in various stages of fineness and under a variety of burning conditions for masonry. Volcanic ash pozzolans were used as a source of silica to react with lime to form a cementitious compound that would withstand weathering conditions. Pozzolans are defined as materials which are capable of reacting with lime in the presence of water at ordinary temperatures to produce cementitious compounds. Italian pozzolana (volcanic), trass and santorin earth are examples of naturally occurring pozzolans of volcanic origin.

Artificial pozzolans are prepared by burning at suitable temperatures certain clays, shales, and diatomaceous earths containing a proportion of clay. Diatomaceous silica and some natural amorphous silica deposits may also form pozzolans, either with or without heat treatment. Coal fly ash produced in electric power plants is also termed a pozzolan because the particles react with the lime liberated in the hydration of Portland cement to form a cementitious material.

Based upon study and observations, I believe that the reason fly ash reacts with lime to form cementitious compounds is that the coal fly ash contains alumina in a range from 20–40% in Class F fly ash (ASTM C-618-80). A review of the strength gain curve of fly ash/cement mixtures indicates that strength does not come in until later in the 28-day period or beyond, and then continues to gain strength after this period over mixes containing higher proportion of cement.

For example, it is known that a typical ready-mix concrete using only 400 pounds of cement and 117 pounds of fly ash may show a lower initial strength gain as compared to a mix containing 517 pounds of straight cement, at periods of less than 28 days, but will surpass the strength of 517 pounds of straight cement at the 28-day period. The higher strength gain of the fly ash mixture will remain in effect from there on, and results in a 25% higher ultimate strength while using 117 pounds less cement.

I believe that the initial slow strength gain of the cement/fly ash mix at less than 28 days may be attributable to the fact that the lime is not immediately liberated in the hydration of Portland cement. Also, I believe the fact that alumina in fly ash is enclosed in a glass matrix makes the alumina not readily available to react in the reaction with the lime to form calcium-alumino-silicates and thereby provide early strength. However, over a period of time, the glass matrix is solubilized or eroded, making available its alumina content for reaction.

SUMMARY OF THE INVENTION

I have discovered that the addition of a source of an alumina clay or other comparable fine grain source of calcium aluminate in a cement/fly ash mix will hydrate into tricalcium aluminate and greatly accelerate both the initial set and the strength gain in the reaction. A number of natural-occurring clays contain alumina. Kaolin contains about 35–39% alumina and is also relatively expensive. On other hand, gibbsite contains up to 69% alumina, and waste gibbsite, which is relatively inexpensive, can have an alumina content of about 30–45%. Finely divided unfired bauxite could also be used as a natural source of alumina.

For the purpose of understanding the nature of the reaction, silica in fly ash is expressed as $SiO_2$. A clearer expression is O=Si=O. The two double bonded oxygen groups mean that the silicate is generally insoluble, and the double bond may be broken only by a strong acid or alkali. The reaction with lime in either pure form such as mortars developed by the Greeks and Romans or with the lime liberated in the hydration of Portland cement involves alkali that solubilizes the silica for bonding with the lime particles. The solubilization of the glass matrix allows the exposed alumina to react or accelerate the reaction with the cement.

Alumina in a combined state in cement behaves as an acid. It occurs combined with silica in all clays and in these it may be regarded as a base. It also occurs in a hydrated form, mixed with a proportion of ferric oxide and smaller amounts of titania and silica, in bauxite. This is used in the manufacture of high-alumina cement. The natural forms of alumina are gibbsite $Al_2O_3 3H_2O$, Dispore ($Al_2O_3$) and Boehmite or bauxite ($Al_2O_3$).

I have discovered that the addition to a fly ash/hydraulic concrete mixture of a small quantity of an alumina clay has the effect of reversing the delayed onset of strength gain of the mixture with the result that a substantial increase in early strength is obtained and ultimately an increase is achieved in the ultimate or total strength. I first observed this effect in the strength development of cold bonded aggregate mixtures for pellets, and confirmed the same in a number of controlled experiments and tests using mixtures of Portland cement, (Class F fly ash, water, sand, and alumina clay, as set forth in further detail below.

I have discovered that the addition of a small amount of alumina clay will add substantial green pellet strength to fly ash pellets as well as substantial one-day, three-day, and 28-day strengths to cement/fly ash mixtures.

I have also found that the use of calcium aluminate, such a provided by an alumina clay, may be used to coat a cold bonded aggregate particle to reduce water absorption and provide additional early pellet strength.

The use of alumina as provided in an alumina clay, provides both early and ultimate strength enhancement, and in a concrete mix, permits a substantial increase in the fly ash replacement factor. Further, a dry fine-grained surfactant may be used to eliminate the need for a water-reducing agent, thereby providing further savings.

It is accordingly an important object of this invention to provide a method by which both early strength and ultimate strength of cementitious mixtures including cement and fly ash may be increased.

A further object of the invention is the provision of a cementitious mixture, as outlined above.

A still further object of the invention is the provision of a product and process by means of which a greater portion of the Portland cement component in the mix may be replaced by fly ash.

Another object of the invention is the provision of a mix and method for enhancing early strength and providing rapid strength gain in cementitious mixtures, with the addition of natural alumina clay in the mix.

These and other objects and advantages of the invention will be apparent from the following description, the accompanying drawings, and the appended claims.

BRIEF DESCRIPTION OF ACCOMPANYING DRAWINGS

FIG. 3 is a reactive chart for fly ash and lime; and

FIG. 4 illustrates the particle reaction between fly ash, calcium aluminate and lime.

DESCRIPTION OF PREFERRED EMBODIMENTS

Figure 1:
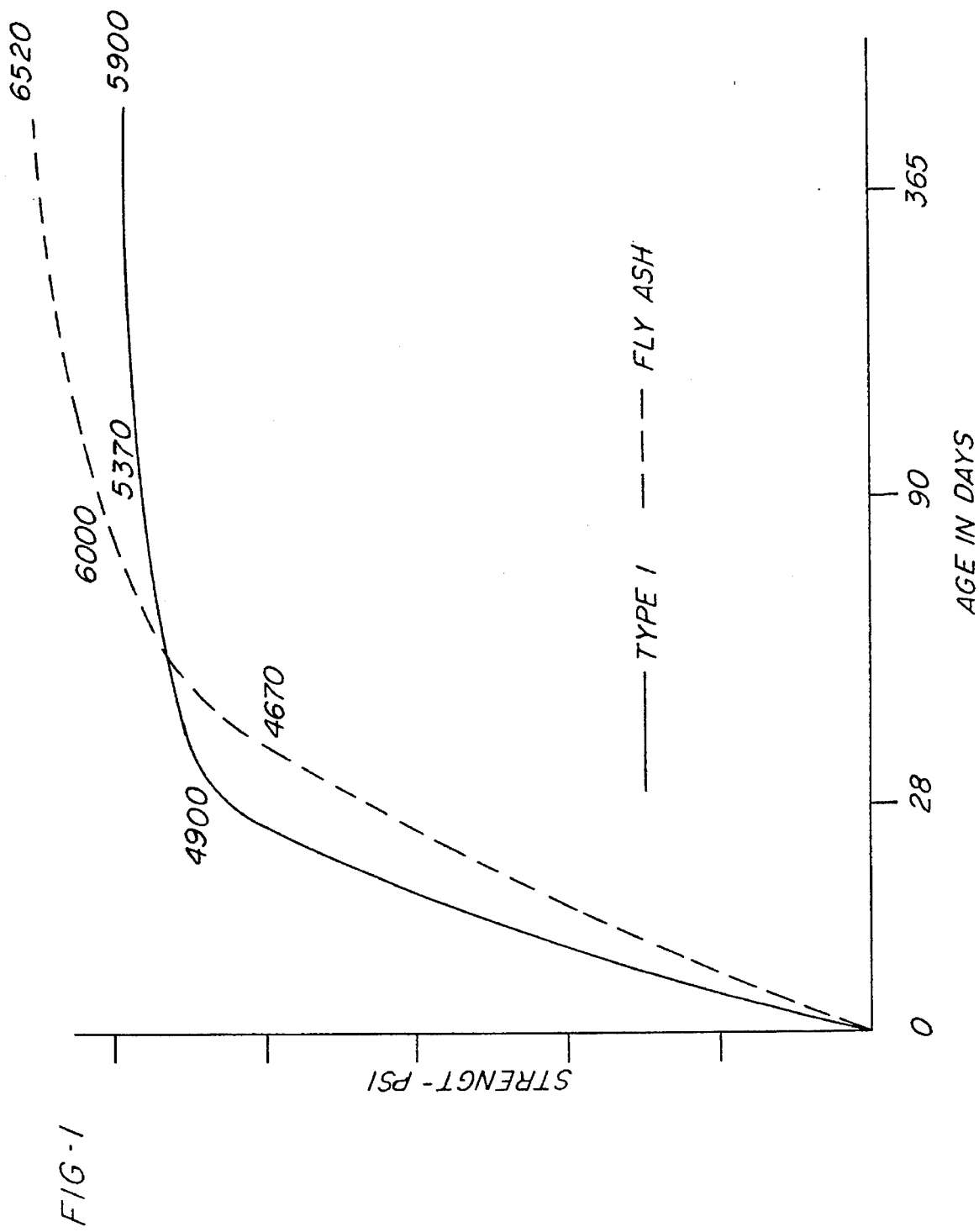
FIG. 1 is a graph illustrating the comparative rate of gain in strength between straight concrete mixes without fly ash and mixtures with Class F fly ash replacement (20% replacement)

Attention is directed first to the reaction chart of FIG. 3 in which represents the mechanism of the reaction of a lime particle in the cement with the alumina component of fly ash. The fly ash particle 10 is shown as having an encasing glass (silicon dioxide) matrix 12. In water, the lime molecule 14 cannot react with the aluminate core of the fly ash particle until the double bond of the silicone dioxide molecule is broken by the alkali of the lime. Thereafter the hardening will begin to accelerate as represented by the combined calcium alumina silicate molecule 15, as shown by the graph of FIG. 1.

In FIG. 4 I have illustrated the bonding in a water medium of the fly ash particle 10 to the lime molecule 14 by the calcium aluminate component 20 of alumina clay added to the mix.

As a preliminary test to determine whether the addition of alumina clay to a coal fly ash/cement mix would show a specific reaction, two separate mixes were prepared. Mix 1 was a simple 10% Portland cement, 90% type F coal fly ash, and sufficient water for hydration and pelletization. Mix 2 was the same as mix 1 except about 5% of the coal fly ash was replaced with about 5% alumina clay, containing 36% alumina oxide. Both samples were submitted to X-ray defraction analysis. Only mix 2 confirmed the presence of tricalcium aluminate in the matrix, not present in the straight fly ash mixture. This confirmed that the alumina clay had reacted with the cement and fly ash particles in water.

Random mixtures of 90% Class F fly ash and 10% Portland cement, such as Mix 1 above, were prepared for pelletization of fly ash with little success. The fly ash was gap sized in micron size. After mixing with the fly ash and a sufficient quantity of water the mix would not pelletize or gain or develop strength. The pellets had no green pellet strength and would disintegrate during the pelletizing and handling process.

The addition of 5% alumina clay provided the following results:

A. The mixture immediately began to pelletize facilitating the manufacture of reduced size pellets that are desirable for use in the manufacture of concrete masonry units.

B. The pellets displayed excellent green pellet strength. By green pellet strength I mean that the pellets must fall to a concrete floor from a height of 30 feet and hold together, bounce, and not disintegrate upon impact. Pellets manufactured with conventional Class F fly ash and 10% Portland cement were destroyed upon impact prior to adding 5% alumina clay. The addition of 5% alumina clay to the 10% Portland cement, 85% fly ash completely corrected the green pellet strength problem.

C. The addition of 5% alumina clay provided good strength development during a 48-hour curing period. The material continued to cure and gain strength and became superior to anything prior to the addition of the 5% alumina clay.

A series of mixes were prepared using pelletizing formulations, Class F coal fly ash as defined in ASTM C-618-80, and Portland cement for the purpose of testing and demonstrating the effect on the compressive strength. The mixes are set out in Table 1A and the respective compressive strengths in pounds per square inch are set out in Table 1B.

TABLE 1A

| Material | Mix #10 | Mix #12 | Mix #7 | Mix #8 | Mix #22 |
| --- | --- | --- | --- | --- | --- |
| Fly Ash | 90% | 90% | 85% | 85% | 85% |
| Cement | 10% | 10% | 10% | 10% | 10% |
| Water | 18% | 23% | 13% | 23% | 23% |
| Kaolin Alumina Clay | — | — | 5% | 5% | 5% |

TABLE 1B

| Compressive Strength: PSI (pounds per square inch) | | | | | |
| --- | --- | --- | --- | --- | --- |
| Material | Mix #10 | Mix #12 | Mix #7 | Mix #8 | Mix #22 |
| 1 Day | 58 | 114 | 104 | 154 | 234 |
| 3 Days | 78 | 138 | 150 | 313 | 530 |
| 7 Days | 127 | 234 | 243 | 598 | 572 |
| 14 Days | 82 | 238 | 163 | 640 | 590 |
| 28 Days | 163 | 293 | 237 | 666 | — |

Mixes Nos. 10 and 12 were control mixes in that they contained simply 90% fly ash and 10% cement, differing only in water content. The compressive strengths as identified in Table 1B are typical for such a pelletizing formulation using fly ash in cement. The higher water content of mix #12, also present in mixes #8 and 22 facilitated better hydration of the cement and produced mixes which could be packed in better condition into the cube molds for compressive testing.

The low compressive strength results of Mix #10 may have been due in part to insufficient water content and difficulty of packing into the cube molds. Mixes #7, 8 and 22 should be compared. In these mixes, 5% of the fly ash was replaced with Kaolin alumina clay having an alumina oxide content of about 36–37% in finely divided form of 1 micron or less particle size, obtained from J. M. Huber Corporation, One Huber Road, Macon, Ga., U.S.A. 21298. The early compressive strengths of Mixes Nos. 8 and 22 show a consistent and substantial increase over either of Mixes Nos. 10 or 12.

Mix No. 7 also contained 5% Kaolin, but did not exhibit substantial strength increases, probably due to insufficient water for hydration (13% as compared to 23% for mixes 8 and 22). However, Mix No. 7, which had insufficient water, showed a substantial improvement in early strength over that of Mix No. 10.

The following were prepared using the ASTM C-109 cube procedure, for the purpose of comparing cubes for compressive strength analysis, utilizing a given or known mixture, representative of an actual concrete mix with the water content determined by the flow table. These are set forth in the following Table 2 for Mixes 33, 34 and 36.

TABLE 2A

| Material | Mix #33 | Mix #34 | Mix 36 |
| --- | --- | --- | --- |
| Fly Ash | — | 100 g. | 148 g. |
| Cement | 500 g. | 400 g. | 400 g. |
| Sand | 1,375 g. | 1,281 g. | 1,375 g. |
| Alumina Clay | — | 94 g. | — |
| Water | 230 g. | 288 g. | 239 g. |
| Flow | 108 | 110 | 108 |

TABLE 2B

| Compressive Strength: PSI (pounds per square inch) | | | |
| --- | --- | --- | --- |
| Material | Mix #33 | Mix 34 | Mix 36 |
| 1 Day | 1,317 | 1,325 | 465 |
| 3 Days | 2,500 | 2,062 | — |
| 7 Days | 2,980 | 2,910 | — |

Mixture 34 confirms; that a normal 20% replacement of cement with fly ash plus about 5% alumina clay equates to a straight Portland cement mixture with no replacement of the cement in terms of early strength.

Mix 36 demonstrates a substantial reduction of strength at 1 day with a straight 20% replacement of cement with fly ash. This series of tests in Table 2 demonstrates that a 40% replacement of cement with a combination of fly ash and alumina clay would be superior to conventional mixtures which have a 20% replacement of cement with Class F fly ash.

Table 2 also demonstrates that an alumina clay in a range of from about 1% to 10% and Class F fly ash as an additive will produce an enhanced pozzolan for the purpose of cement replacement in cement/sand mixes as well as in mixes intended for pelletization as set forth in Table 1.

The addition of a powdered non-ionic surfactant to add as a surface-active agent and as a dispersing agent would enhance the pozzolan effect of the fly ash, alumina clay material. Examples include anionic powder sodium lauryl sulfate WA-100 and "Stepanol" ME-DRY and anionic powder alkyl lauryl sulfonate "Nacconal" 90-G of Stepan Co., Edens & Winnetka Rd., Northfield, Ill. 60093.

The additions of small amounts of either calcium formate or calcium nitrite or combinations of these in the range of about 0–3% could further enhance the strength gaining potential of such an enhanced pozzolan.

The addition of carboxyl methyl cellulose as a dispersing agent and a water thickening agent to retain water around and over the cement, the fly ash, and the calcium aluminate particles, would also enhance the reaction and hydration of Portland cement. The addition would be about 0–3% by weight.

A batch mix was prepared for pelletization as possible:

| Class F fly ash | 1,700 pounds | 85% |
| --- | --- | --- |
| Cement, | 200 pounds | 10% |
| Alumina clay | 100 pounds | 5% |

Sufficient water for pelletization. Two-inch cubes were made in molds for compressive strength tests, which tested as follows:

| 1 day | 400 psi |
| --- | --- |
| 2 days | 663 psi |
| 3 days | 814 psi |
| 6 days | 1,439 psi |

This batch mix further demonstrates the substantial early strength in a pelletizing formulation and confirms the early strengths reported for mixes 8 and 22 of Table 1, which early strengths substantially exceed those of test mixes which did not include alumina clay.

Figure 2:
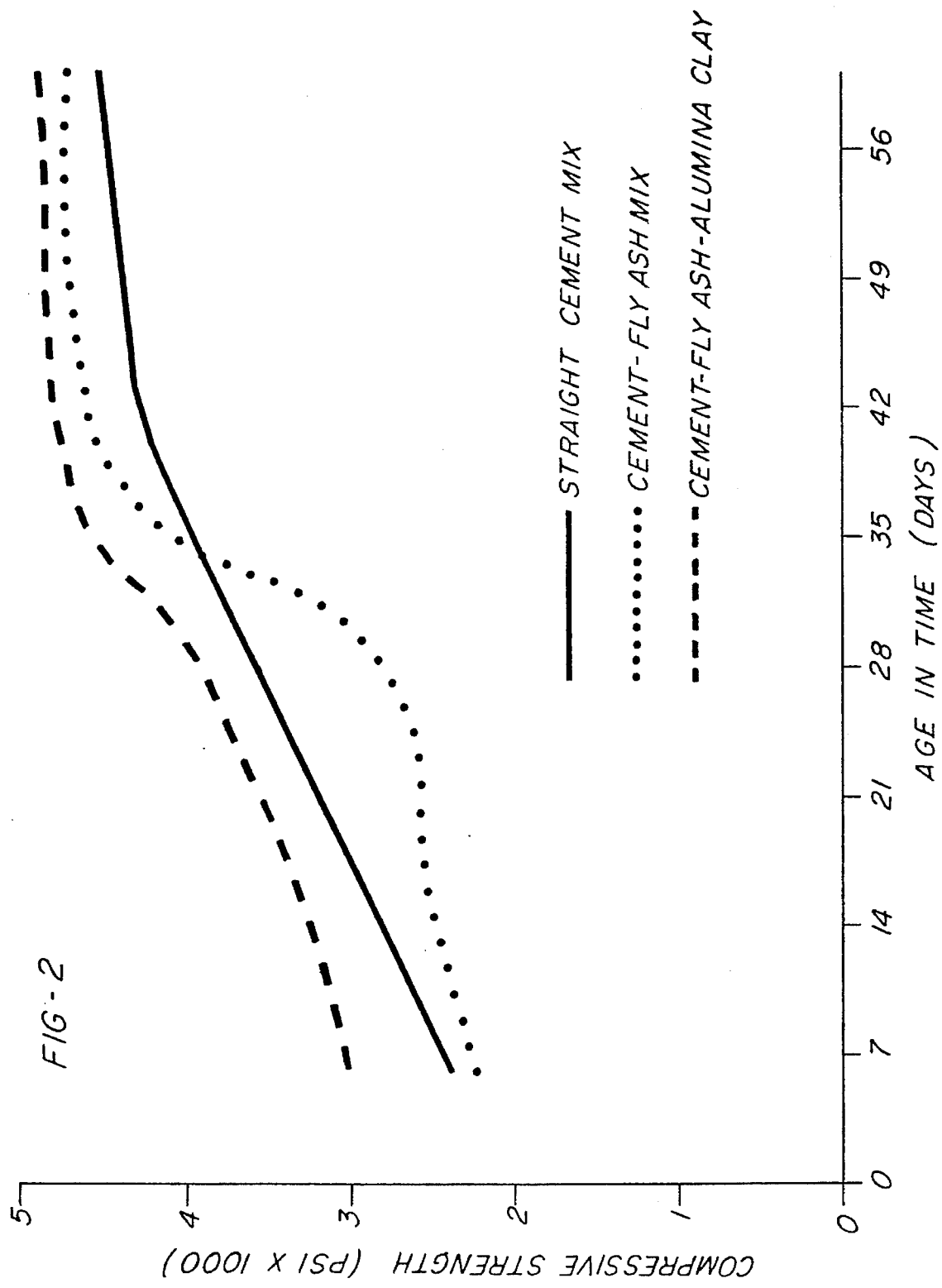
FIG. 2 is a graph comparing relative strength gains including compositions made in accordance with this invention.

The typical strength gains of type 1 cement mixes with and without fly ash are illustrated in the graph of FIG. 1. It will be seen that the addition of fly ash as a replacement for cement will delay the gain strength for approximately the first 28 days, but thereafter the strength will exceed that of a mix without fly ash replacement. This graph or chart in FIG. 1 should be compared with the chart of FIG. 2. On the chart of FIG. 2, the straight cement mixes are compared again with a fly ash replacement mix and a cement fly ash alumina clay in accordance with this invention. The 28-day delay is illustrated in FIG. 2 for the straight fly ash replacement mix. However, this delay is not found to exist when the mix is prepared in accordance with this invention and both early initial strength as well as ultimate strength are shown to be improved over the straight cement mix.

Not only are the product and method of this invention useful in ready-mix concrete mixes and pelletizing formulations, they are also useful in a wide variety of cementitious hydraulic mixes including concrete pipe, cold bonded aggregate, soil stabilization, precast and prestressed concrete, and specialty concrete products. Further, cold bonded aggregates can be coated with calcium aluminate and cement to reduce water absorption and provide additional strength to the pellet.

While the methods herein described, and the forms of apparatus for carrying these methods into effect, constitute preferred embodiments of this invention, it is to be understood that the invention is not limited to these precise methods and forms of apparatus, and that changes may be made in either without departing from the scope of the invention, which is defined in the appended claims.

What is claimed is:

1. In a method of improving the initial green strength of pellets formed from a cementitious mixture comprising: 1) about 85 wt. % and greater Class "F" fly ash having an $SiO_2$ coating surrounding an aluminate containing core, and, 2) a lime containing hydraulic cement component, the improvement comprising:

a) reacting said lime and said $SiO_2$ coating with a finely divided alumina containing material selected from the group consisting of calcium aluminate and alumina clays, said alumina containing material being present in an amount of at least about 5% of the combined dry weight of said mixture;

b) adding sufficient water to hydrate said mixture; and c) forming pellets from said hydrated mixture whereby said pellets are characterized by their ability to be dropped from a height of about 30 feet to a concrete surface without disintegrating upon contact with said surface.

2. Method as recited in claim 1 wherein said fly ash is present in an amount of about 90% by weight based on the dry weight of said mixture.

3. Method as recited in claim 1 wherein said step a) comprises adding an alumina clay to said cementitious mixture.

4. Method as recited in claim 3 wherein said alumina clay is kaolin clay.

5. Method as recited in claim 3 wherein said alumina clay is mullite.

6. Method as recited in claim 3 wherein alumina clay gibbsite.

7. Method as recited in claim 1 wherein said calcium aluminate comprises unfired bauxite.

8. Method as recited in claim 1 wherein said step (b) occurs prior to said step (a).

9. Method as recited in claim 1 further including adding a surfactant to said mixture.

10. Method as recited in claim 1 further including adding a carboxymethylcellulose to said mixture.

* * * * *

UNITED STATES PATENT AND TRADEMARK OFFICE
CERTIFICATE OF CORRECTION

PATENT NO.   : 5,484,480
DATED        : January 16, 1996
INVENTOR(S)  : Robert W. Styron It is certified that error appears in the above-indentified patent and that said Letters Patent is hereby corrected as shown below:

Column 8, line 16, after "wherein", insert --said--.

Column 8, line 16, after "clay", insert --is--.

Signed and Sealed this

Twenty-second Day of October, 1996

Attest:

BRUCE LEHMAN

*Attesting Officer*   *Commissioner of Patents and Trademarks*